United States Patent
Oberdörster

(10) Patent No.: US 9,930,237 B2
(45) Date of Patent: Mar. 27, 2018

(54) MULTICHANNEL OPTICS IMAGE CAPTURING APPARATUS

(71) Applicant: Fraunhofer-Gesellschaft zur Förderung der angewandten Forschung e.V., München (DE)

(72) Inventor: Alexander Oberdörster, Jena (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/182,768

(22) Filed: Jun. 15, 2016

(65) Prior Publication Data

US 2016/0295087 A1    Oct. 6, 2016

Related U.S. Application Data

(63) Continuation of application No. PCT/EP2014/077997, filed on Dec. 16, 2014.

(30) Foreign Application Priority Data

Dec. 19, 2013 (DE) .................. 10 2013 226 789

(51) Int. Cl.
*H04N 5/225* (2006.01)
*G02B 27/58* (2006.01)
(Continued)

(52) U.S. Cl.
CPC ........... *H04N 5/2258* (2013.01); *G02B 27/58* (2013.01); *G06T 3/4053* (2013.01); *H04N 5/23232* (2013.01); *H04N 5/3696* (2013.01)

(58) Field of Classification Search
CPC ............. H04N 5/2258; H04N 5/23232; H04N 5/3696; G02B 27/58; G06T 3/4053
See application file for complete search history.

(56) References Cited

U.S. PATENT DOCUMENTS 6,183,089 B1    2/2001    Tehrani
2005/0057687 A1    3/2005    Irani et al.
(Continued)

FOREIGN PATENT DOCUMENTS

DE    69416671 T2    9/1999
DE    102007006351 A1    9/2007
(Continued)

OTHER PUBLICATIONS

Translation of the International Preliminary Report on Patentability issued in priority application No. PCT/EP2014/077997 dated Jun. 23, 2016 (7 pages).
(Continued)

*Primary Examiner* — Tuan Ho
(74) *Attorney, Agent, or Firm* — Haynes and Boone, LLP; Robert Ziemian

(57) ABSTRACT

The invent on relates to a multichannel optics image capturing apparatus wherein at least a first channel includes anamorphic mapping optics and the first channel has an at least partial field of view overlap with a second channel. Additionally, the invention relates to a multichannel optics image capturing apparatus including at least a first channel and a second channel, wherein the first channel has an at least partial field of view overlap with the second channel, and the second channel includes a first two-dimensional arrangement of detector pixels and the second channel includes a second two-dimensional arrangement of detector pixels, and the first two-dimensional arrangement is incongruent with respect to the second two-dimensional arrangement. The suggested solution achieves that the resolution of an overall image composed of individual images of the channels is essentially distance-independent with respect to an object to be captured.

32 Claims, 4 Drawing Sheets

(51) Int. Cl.
  *G06T 3/40*  (2006.01)
  *H04N 5/232*  (2006.01)
  *H04N 5/369*  (2011.01)

(56) References Cited

U.S. PATENT DOCUMENTS

| | | |
|---|---|---|
| 2009/0122175 A1 | 5/2009 | Yamagata |
| 2010/0013857 A1 | 1/2010 | Fleet et al. |
| 2010/0073463 A1 | 3/2010 | Momonoi et al. |
| 2010/0171866 A1 | 7/2010 | Brady et al. |
| 2010/0321511 A1 | 12/2010 | Koskinen et al. |
| 2011/0228142 A1 | 9/2011 | Brueckner et al. |
| 2012/0050562 A1 | 3/2012 | Perwass et al. |
| 2012/0188389 A1 | 7/2012 | Lin et al. |
| 2013/0128087 A1 | 5/2013 | Georgiev et al. |
| 2013/0155198 A1 | 6/2013 | Nagano |
| 2013/0308026 A1 | 11/2013 | Black |
| 2017/0187933 A1* | 6/2017 | Duparre ............... H04N 5/2254 |
| 2017/0195565 A1* | 7/2017 | Ollier ................. H04N 5/23238 |
| 2017/0208257 A1* | 7/2017 | Laroia ................ H04N 5/23296 |

FOREIGN PATENT DOCUMENTS

| | | |
|---|---|---|
| DE | 102010031535 A1 | 1/2012 |
| EP | 2289235 | 12/2009 |
| JP | 2012044443 A | 3/2012 |
| JP | 2012525028 A | 10/2012 |
| JP | 2012249125 A | 12/2012 |
| WO | WO 2006/101064 | 9/2006 |
| WO | WO 2009/151903 A2 | 12/2009 |

OTHER PUBLICATIONS

Office Action issued in parallel Japanese Patent App. No. 2016-541116 dated Sep. 19, 2017 (20 pages with English translation).

Ng, et al., "Light Field Photography with a Hand-held Plenoptic Camera," Stanford University Computer Science Tech Report CSTR 2005-02. Apr. 2005 (11 pages).

Georgiev, et al., "Focused Plenoptic Camera and Rendering," Journal of Electronic Imaging, vol. 19, Issue 2, 2010 (28 pages).

Ben-Ezra, et al., "Penrose Pixels fro Super-Resolution," IEEE Transactions on Pattern Analysis and Machine Intelligence (PAMI), vol. 33, No. 7, pp. 1370-1383, Jul. 2011 (14 pages).

Office Action issued in priority application No. DE102013226789.4 dated Sep. 9, 2014 (10 pages).

* cited by examiner

MULTICHANNEL OPTICS IMAGE CAPTURING APPARATUS

CROSS-REFERENCE TO RELATED APPLICATIONS

This application is a continuation of copending International Application No. PCT/EP2014/077997, filed Dec. 16, 2014, which is incorporated herein by reference in its entirety, and additionally claims priority from German Application No. 10 2013 226 789.4, filed Dec. 19, 2013, which is also incorporated herein by reference in its entirety.

BACKGROUND OF THE INVENTION

The patent application relates to a multichannel optics image capturing apparatus wherein at least a first channel comprises an at least partial field of view overlap with the second channel.

Multichannel optics image capturing apparatuses that use mapping optics of juxtaposed optical channels instead of an individual lens exist (Fleet et al., Venkartaraman et al., A. Oberdörster et al.). The individual images generated in the channels are captured separately and combined electronically to an overall image. Some multichannel systems operate with overlap, i.e. a region of a field of view is mapped by several channels. This results in a redundancy which can be used for obtaining additional information such as depth maps.

Such a redundancy, however, also reduces the overall resolution of the image capturing apparatus. Thus, in some cases, the viewing directions of the channels are adjusted such that the sampling patterns of two channels are detuned with respect to one another on an object or object part to be mapped. Thus, a second channel does not only contribute further information to the overall image due to its differing standpoint but also by refining the sampling. With respective performance of the multichannel optics and post-processing of the data collected by the channels, this results also in a higher resolution of the overall image reconstructed from the individual images, called super resolution.

Since adjacent channels are arranged laterally offset on the sensor, the same frequently have a parallax such that an object appears at different angles, depending on the distance. Due to this parallax, detuning of the sampling patterns depends on the distance. When two channels are detuned in the infinite ideal, there will still be distances where the sampling patterns of these channels are not out of phase but coincide exactly. In these cases, super resolution no longer occurs.

Since the resolution of the image capturing apparatus depends on the distance with regard to the overall image, an additional problem occurs. In a single-channel digital camera, the resolution of the optics has to be adapted to the sampling rate of the image sensor for preventing subsampling and related aliasing. This takes place either by designing the mapping lenses themselves or by incorporating a so-called anti-aliasing filter also called optical low-pass. When the angular resolution as in the above case depends on the distance, the low-pass effect of the scene would have to adapted, for each image part according to its distance. However, dynamic locally adaptable optical low-pass filters have so far been unrealizable.

The problem of distance-dependent resolution concerns not only the above described arrangement, but also other multichannel optics image capturing apparatuses, specifically those where the viewing direction of all channels is the same (Fleet et al., Venkartaraman et al.). Additionally, it concerns so-called plenoptic cameras combining a conventional objective with multichannel optics for mapping an object (Ng et al. T. Georgiev et al.).

However, in a simplified manner, sampling points and sampling patterns can be referred to in multi-channel optics capturing apparatuses, however, a detector pixel of the multichannel optics capturing apparatuses does not measure the intensity at a discrete point, but in an integrated manner across a solid angle. However, the described problem remains the same, depending on the object distance, integration areas of detector pixels of adjacent channels overlap more or less. The lower the overlap, the higher the resolution and the more robust the image reconstruction of the overall image. Consequently, also from this point of view, the resolution of the reconstructed overall image is also dependent on the distance.

Generally, the described problem has so far been accepted. It occurs in multichannel optics image capturing apparatus operating with resolution enhancement by overlapping fields of view. Currently, these systems are rarely used and in conventional single-channel optics image capturing apparatuses, this problem does not exist.

A possible existing approach is the provision of a camera array whose channels are individually rotated (Koskinen et al.). In that way, irregular sampling can be generated. Here, it can be problematic that arrays of complete cameras, i.e. sensor and optics as a whole, have to be twisted against one another, which impedes the provision of a multichannel optics image capturing apparatus built in a compact manner. Additionally, the disadvantage can arise that image fields that are twisted against one another cannot be placed beside one another without wasting space when a continuous sensor substrate is used for all channels.

Further, Penrose pixels exist having a specific geometry for generating pseudorandom sampling patterns (Ben-Ezra et al.). The same are used for resolution enhancement with single-channel systems. Oversampling can take place via multiple captures and shifting the cameras between captures. For this solution, different variations of rhombical pixels are necessitated. In multichannel optics image capturing apparatuses, such an implementation would necessitate significant effort for redevelopment of the pixels and for wiring the pseudorandom pixel arrangement.

According to the above statements, there is a need to provide multichannel optics image capturing apparatuses eliminating the stated disadvantages. In particular, multichannel optics image capturing apparatuses are to be provided whose resolution is essentially distance-independent. Additionally, compared to existing solutions, the same ought to be produced easier and be built in a more compact manner. By means of multichannel optics image capturing apparatuses improved in that manner, multichannel optics image capturing methods are to enabled by which high-resolution object captures are possible, which are essentially independent of a distance between multichannel optics image capturing apparatus and object.

SUMMARY

An embodiment may have a multichannel optics image capturing apparatus, wherein at least a first channel includes anamorphic mapping optics and the first channel has an at least partial field of view overlap at least with a second channel; wherein all channels include a two-dimensional arrangement of detector pixels, each forming a pixel matrix of pixel rows and pixel columns per channel, wherein the pixel rows and pixel columns of each channel are each arranged perpendicular to one another, and all channels are disposed in a channel matrix of channel rows and channel columns that are perpendicular to one another, and the anamorphic mapping optics is configured to map an object to be mapped onto each channel with a distortion uniquely allocatable to the respective channel with respect to all other channels at an aspect ratio of 1:1.05 or more.

Another embodiment may have a multichannel optics image capturing apparatus having at least a first channel and a second channel, wherein the first channel has an at least partial field of view overlap with the second channel and the first channel includes a first two-dimensional arrangement of detector pixels and the second channel includes a second two-dimensional arrangement of detector pixels, and the first two-dimensional arrangement is incongruent with respect to the second two-dimensional arrangement; wherein the multichannel image capturing apparatus includes a third channel and the third channel includes a third two-dimensional arrangement of detector pixels which is incongruent both with respect to the first two-dimensional arrangement and with respect to the second two-dimensional arrangement.

Another embodiment may have a multichannel optics image capturing apparatus, wherein at least a first channel includes anamorphic mapping optics and the first channel has an at least partial field of view overlap at least with a second channel; wherein a distortion of the anamorphic mapping optics of the first channel is configured such that mapping of an object has a first aspect ratio in the first channel and a second aspect ratio in the second channel, wherein the first aspect ratio is uniquely allocated to the first channel and the second aspect ratio is uniquely allocated to the second channel, such that on each channel a mapping of the object to be captured is captured which is distorted differently when compared to the other channels.

Another embodiment may have a multichannel optics image capturing apparatus including at least a first channel, a second channel and a third channel, wherein the first channel has an at least partial field of view overlap with the second channel and the Out channel includes a first two-dimensional arrangement of detector pixels, the second channel includes a second two-dimensional arrangement of detector pixels, the third channel includes a third two-dimensional arrangement of detector pixels, wherein the first two-dimensional arrangement is incongruent with respect to the second two-dimensional arrangement and the third two-dimensional arrangement is incongruent with respect to the first two-dimensional arrangement and the second two-dimensional arrangement, and wherein the detector pixels of the first channel have a different detector pixel aspect ratio than detector pixels of the second channel; wherein all channels of the multichannel optics image capturing apparatus are juxtaposed with the same distance to their directly neighboring channels.

Another embodiment may have a multichannel optics image capturing method, wherein an object to be captured is captured by a multichannel image capturing apparatus, wherein at least a first channel includes anamorphic mapping optics and the first channel has an at least partial field of view overlap at least with a second channel; wherein all channels of the multichannel image capturing apparatus include a two-dimensional arrangement of detector pixels, each forming a pixel matrix of pixel rows and pixel columns per channel, wherein the pixel rows and pixel columns of each channel are each arranged perpendicular to one another, and all channels are disposed in a channel matrix of channel rows and channel columns that are perpendicular to one another, and the anamorphic mapping optics is configured to map an object to be mapped onto each channel with a distortion uniquely allocatable to the respective channel with respect to all other channels at an aspect ratio of 1:1.05 or more.

Another embodiment may have a multichannel optics image capturing method, wherein an object to be captured is captured with a multichannel image capturing apparatus including at least a first channel and a second channel and the first channel has an at least partial field of view overlap with the second channel, wherein the first channel includes a first two-dimensional arrangement of detector pixels and the second channel includes a second two-dimensional arrangement of detector pixels, and the first two-dimensional arrangement is incongruent with respect to the second two-dimensional arrangement; wherein the multichannel image capturing apparatus includes a third channel and the third channel includes a third two-dimensional arrangement of detector pixels which is incongruent both with respect to the first two-dimensional arrangement and with respect to the second two-dimensional arrangement.

Another embodiment may have a multichannel optics image capturing method, wherein an object to be captured is captured with a multichannel image capturing apparatus, wherein the at least one first channel includes anamorphic mapping optics and the first channel has an at least partial field of view overlap at least with a second channel, wherein a distortion of the anamorphic mapping optics of the first channel is configured such that a mapping of an object has a first aspect ratio in the first channel and a second aspect ratio in the second channel, wherein the first aspect ratio is uniquely allocated to the first channel and the second aspect ratio is uniquely allocated to the second channel, such that on each channel a mapping of the object to be captured is captured which is distorted differently when compared to the other channels.

Another embodiment may have a multichannel optics image capturing method, wherein an object to be captured is captured with a multichannel image capturing apparatus including at least a first channel, a second channel and a third channel and the first channel has an at least partial field of view overlap with the second channel, wherein the first channel includes a first two-dimensional arrangement of detector pixels and the second channel includes a second two-dimensional arrangement of detector pixels, wherein the first two-dimensional arrangement is incongruent with respect to the second two-dimensional arrangement and the third two-dimensional arrangement is incongruent with respect to the first two-dimensional arrangement and the second two-dimensional arrangement, and wherein the detector pixels of the first channel have a different detector pixel aspect ratio than detector pixels of the second channel; wherein all channels of the multichannel optics image capturing apparatus are juxtaposed with the same distance to their directly neighboring channels.

The claimed apparatuses and methods make it possible to obtain comparatively high-resolution and robust overall images from individual images captured by channels of the multichannel optics image capturing apparatus. The resolution of the overall image is mostly distance-independent since the channels provide an improved sampling pattern for the object space. The invention prevents that sampling points of the channels accumulate when objects are captured at specific distances, such that according to the invention a relatively homogeneous sampling of the object space is obtained whose density is sufficiently distance-independent.

At the same time, it becomes possible to select arrangements of detector pixels that are relatively easy to produce, such that the production of the multichannel optics image capturing apparatuses can be performed in a comparatively simple and cost-effective manner. Further advantages of the invention will be discussed below based on embodiments which are part of the dependent claims.

In embodiments of the invention, it is intended that each channel of the multichannel optics image capturing apparatus comprises a two-dimensional arrangement of detector pixels and a mapping optics that is configured to effect mapping onto the arrangement of detector pixels. In that way, all channels can be produced in comparative production methods, such that cost-effective production becomes possible. Additionally, the two-dimensional arrangement of the detector pixels allows a compact design. However, only one or some of the channels, for example two channels, can comprise a two-dimensional arrangement of detector pixels and a mapping optics that is configured to effect mapping onto the arrangement of detector pixels when the purpose of application necessitates such a configuration. Advantageously, the two-dimensional arrangement is arranged within one plane in all channels, however, in one or several channels the same can also be curved in a concave or convex manner with regard to the viewing direction of the channel configured in that way.

In embodiments of the invention, two or more channels have different viewing directions. In that way, advantageously, a relatively great object space can be sampled. In some embodiments, all channels have different viewing directions. However, in embodiments, it is also intended that two or more channels have the same viewing directions. Also, all channels can have the same viewing directions. In that way, a particularly effective super resolution can be obtained.

In some embodiments it is intended that the fields of view of two or more channels partly overlap. In that way, a higher resolution of the overall image composed of the individual images of the individual channels can be obtained. In some embodiments, it is intended that the fields of view of two channels overlap by more than 10%, for example also by more than 20% or even by more than 30%, more than 70% or also more than 90%. In some embodiments, the fields of view of two adjacent channels partly overlap. In some embodiments, the fields of view of all channels partly overlap. Some embodiments of the invention are characterized in that the fields of view of two or more channels overlap completely. In that way, a particularly high local resolution can be obtained. Also, embodiments are provided where the fields of view of all channels overlap completely. In other embodiments, the fields of view of two adjacent channels overlap completely.

In some embodiments of the present invention, the anamorphic mapping optics comprises one or several microlenses which are configured to map an object to be mapped at an aspect ratio of 1:1.05 or more on an arrangement of detector pixels of the first channel in a distorted manner. In that way, a particularly favorable and simple resolution can result with the help of which the resolution enhancement in multichannel optics image capturing apparatuses can be set in a distance-independent manner. A particular advantage of this embodiment can result in that generally known pixels having a rectangular and additionally square shape in a top view along a detection direction can be used for image capturing such that a particular cost-effective production of a multichannel optics image capturing apparatus can be enabled. Some or all detector pixels of the image capturing apparatus can also have a rectangular and additionally non-square shape in top view. A detector pixel can have a rectangular and additionally non-square shape when the same has exactly four sides in a top view parallel to a detection direction of the detector pixels, two of which are of the same length and are additionally arranged parallel to one another, such that two side pairs of sides of the detector pixel that are parallel to one another form a geometrically closed shape comprising four equal interior angles of 90° each between two sides respectively, wherein sides of this geometrical shape arranged at an angle of 90° to one another have different lengths, such that two sides of the detector pixel arranged to one another at an angle of 90° have a detector pixel aspect ratio to one another that differs from a detector pixel aspect ratio of 1:1. In contrast, a detector pixel having a rectangular and additionally square shape can have four sides of the same length forming a geometrically closed shape with four equal interior angles of 90° each, wherein the detector pixel aspect ratio of two sides arranged at an angle of 90° to one another is 1:1. The detector pixel aspect ratio of detector pixels having a rectangular and additionally non-square shape is, for example, 1:1.05 or more, for example 1:1.1 or more, 1:2 or more or even 1:10 or more. The detector pixel aspect ratio of a detector pixel may be unequal to the aspect ratio of the optical distortion, which can be effected by the microlenses. In embodiments of the invention, one, several or all detector pixels can have a round, for example circular shape in a top view along a detection direction. In embodiments, it is intended that the aspect ratio of the object to be mapped is distorted by means of microlenses in a ratio 1:1.1 or more. Other embodiments intend that the aspect ratio of the object to be mapped is mapped in a distorted manner at a ratio of 1:1.3 or more, 1:1.5 or more, 1:2 or more, 1:5 or more, 1:8 or more or even 1:10 or more. Non-distorted mapping corresponds to mapping at the aspect ratio of 1:1, which means that the object is mapped in a realistic manner in the image plane with respect to the aspect ratio. It is possible that two or more microlenses of the mapping optics are configured to map the object to be mapped at an aspect ratio of 1:1, i.e. in an undistorted manner, for example when the object of the invention is not to be solved by means of a distorting mapping optics. Then, for example, even all microlenses can be configured to map the object to be mapped in a non-distorted manner.

In embodiments of the invention it is intended that all channels comprise a two-dimensional arrangement of detector pixels, forming a pixel matrix of pixel rows and pixel columns per channel, wherein the pixel rows and pixel columns of each channel are arranged perpendicular to one another and all channels are arranged in a channel matrix of channel rows and channel columns arranged perpendicular to one another and the anamorphic mapping optics is configured to map an object to be mapped onto each channel with a distortion uniquely allocatable to the respective channel with respect to all other channels at an aspect ratio of 1:1.05 or more. In that way, it can be achieved that a mapping of the object to be captured can be captured which is distorted differently on each channel compared to the other channels. In that way, it can be prevented in a very favorable manner that the sampling pattern of the channel accumulates at a specific distance, since the mapping optics can map a different mapping of the object on each channel. Thus, distance-dependent resolution loss is reduced or prevented. Instead, it is achieved that the sampling pattern remains relatively homogeneous independent of the distance and enables distance-independent sampling of the object space with consistently sufficient density. According to some embodiments, the mapping optics is configured such that distortion takes place uniformly or at least continuously varying across the respective channel or across all image points/pixels of the channel. Continuous variation means, for example, changing the extension (aspect ratio>1) from a center of the optics with respect to a channel towards an edge of the respective channel. In some embodiments, it is intended that all channels have one pixel matrix each, wherein a pixel row width is equal to a pixel column width. In other embodiments, it is intended that all channels have one pixel matrix each, wherein a pixel row width is unequal to a pixel column width. Additionally, embodiments are provided in the channel matrices of which additionally or alternatively all channel columns are arranged parallel to one another and/or all channel rows are arranged parallel to one another. Such channel matrices are particularly easy to produce and hence allow cost-effective production of a multichannel optics image capturing apparatus according to the present invention. In embodiments, it is intended that the first channel comprises detector pixels having a different detector pixel aspect ratio than detector pixels of the second channel. All detector pixels of a channel can have the same detector pixel aspect ratio or different detector pixel aspect ratios. Additionally, all detector pixels of a channel can have the same or different shapes in a top view. For example, some or all detector pixels of a channel can be rectangular and additionally non-square. Also, some or all detector pixels of all channels can be rectangular and additionally non-square. In some embodiments, each channel comprises detector pixels that are rectangular and additionally non-square, wherein the detector pixel aspect ratio of these detector pixels differs individually from channel to channel, such that each channel can be uniquely identified via its detector pixel aspect ratio.

In some embodiments, the anamorphic mapping optics comprises one or several microlenses having a cylindrical surface. The same can be particularly suitable for mapping an object to be mapped with an amended aspect ratio in a distorted manner onto an arrangement of detector pixels. In embodiments, these microlenses are configured as cylindrical lenses.

Some embodiments of the invention intend that the multichannel optics image capturing apparatus is a plenoptic camera additionally comprising a further lens upstream of the mapping optics. The mapping optics can be an anamorphic mapping optics. Plenoptic cameras can allow the generation of individual captures of an object via a plurality of channels and subsequently the setting of the focus of an overall image composed of the individual captures. In such plenoptic cameras, distance-independent sampling of the object space with consistent high resolution can be particularly advantageous, since in some embodiments of plenoptic cameras, channels having a reduced pixel number compared to channels of commercial digital cameras are used. Thus, it can be particularly desirable to reduce or prevent a distance-dependent resolution loss.

In some embodiments of the invention, the first channel comprises a first two-dimensional arrangement of detector pixels and the second channel a second two-dimensional arrangement of detector pixels, and the first two-dimensional arrangement is incongruent with respect to the second two-dimensional arrangement. This allows an embodiment where not only the optics of the multichannel optics image capturing apparatus but also the capturing electronics can contribute to an improved resolution of the object to be captured, such that the resolution is mostly or completely distance-independent. If the second two-dimensional arrangement is incongruent with respect to the first two-dimensional arrangement, it is also achieved that independent of the distance of the object to be captured a relatively homogenous sampling of the object space having a sufficiently distance-independent density is enabled. A parallax effect is reduced or prevented, such that an improved multichannel optics image capturing apparatus can be provided. By combining detector pixels of a first channel and a second channel two-dimensionally arranged in an incongruent manner, in addition to using an anamorphic mapping optics, further enhancement of a homogeneous sampling that is distance-independent can be obtained. In embodiments it is intended that the first channel comprises detector pixels having a different detector pixel aspect ratio than detector pixels of the second channel. All detector pixels of a channel can have the same detector pixel aspect ratio or different detector pixel aspect ratios. Additionally, all detector pixels of a channel can have the same or different shapes. For example, all detector pixels of a channel can be rectangular and additionally non-square. Also, all detector pixels of all channels can be rectangular and additionally non-square. In some embodiments, each channel comprises detector pixels that are rectangular and additionally non-square, wherein the detector pixel aspect ratio of these detector pixels differs individually from channel to channel, such that each channel can be uniquely identified via its detector pixel aspect ratio.

In some embodiments of the invention, the first two-dimensional arrangement is geometrically similar to the second two-dimensional arrangement. This can have the advantage that essentially the same production methods can be used for the two channels. In this way, a cost-effective multichannel optics image capturing apparatus can be provided which can be relatively easy to produce. The first two-dimensional arrangement in some embodiments can be converted to the second two-dimensional arrangement by rotation extension and translation. In other embodiments, the first two-dimensional arrangement can be converted to the second two-dimensional arrangement by folding extension and translation. For example, in embodiments, the first two-dimensional arrangement can be converted to the second two-dimensional arrangement by translation and additional two-dimensional extension in a plane of the arrangement. The first two-dimensional arrangement can also be incongruent and dissimilar to the second geometrical arrangement. For example, the first two-dimensional arrangement can consist of a regular grating of columns and rows of detector pixels while the second two-dimensional arrangement consists of a pseudorandom arrangement of detector pixels, for example of Penrose pixels.

Some embodiments of the invention intend that the first two-dimensional arrangement can be converted to the second two-dimensional arrangement by translation and additional one-dimensional extension. This can result in the advantage that the production method for the channel electronics can be particularly simple.

In some embodiments, the first two-dimensional arrangement can be converted to the second two-dimensional arrangement by translation, additional one-dimensional extension and additional rotation. In this way, particularly favorable sampling patterns can be provided for the object space. The first two-dimensional arrangement and the second two-dimensional arrangement can be detuned to one another by additional rotation such that a particularly homogeneous sample of the object space is enabled whose density is sufficiently distance-independent. In a top view, for example, the rotation can be performed perpendicularly to the first two-dimensional arrangement by 90°. This means that a second two-dimensional arrangement can be provided in a simple manner which can differ significantly from the first two-dimensional arrangement. In other embodiments, the rotation is smaller, for example less than 90° or even less than 70° or even less than 50° or even less than, for example, 25°. In embodiments of the invention, the first two-dimensional arrangement can be converted to the second two-dimensional arrangement by translation and additional rotation, for example when the first two-dimensional arrangement comprises detector pixels whose detector pixel aspect ratio differs from the detector pixel aspect ratio of the second two-dimensional arrangement. In this way, the production can be extremely simplified and the parallax effect can still be reduced.

There are embodiments of the invention where the detector pixels of the two-dimensional arrangement are arranged in pixel rows and pixel columns and the detector pixels of the second two-dimensional arrangement are arranged in pixel rows and pixel columns. In this way, a particularly regular sampling of the object space can be obtained and the image capturing apparatus can be easy to produce, wherein, at the same time, due to the incongruency of the first two-dimensional arrangement and the second two-dimensional arrangement, an essentially distance-independent resolution of the overall image can be obtained. The detector pixels can have a rectangular and additionally square shape in a top view. Such detector pixels are particularly easy to produce. However, one or several detector pixels can also have a rectangular and additionally non-square shape in a top view, for example in order to be able to fill the pixel rows and pixel columns in embodiments of the invention in a particularly extensive manner, when the same are to be arranged, for example, in a pixel matrix where the pixel rows and pixel columns form rectangular and additionally non-square fields, i.e. a row height is to differ from a column width. A detector pixel can have a rectangular and additionally non-square shape when the same has exactly four sides in a top view parallel to a detection direction of the detector pixels, two of which are of the same length and are additionally arranged parallel to one another, such that two side pairs of sides of the detector pixel that are parallel to one another form a geometrically closed shape comprising four equal interior angles of 90° each between two sides respectively, wherein sides of this geometric shape arranged at an angle of 90° to one another have different lengths, such that two sides of the detector pixel arranged at an angle of 90° to one another have a detector pixel aspect ratio that differs from a detector pixel aspect ratio of 1:1. In contrast, a detector pixel having a rectangular and additionally square shape can have four sides of the same length forming a geometrically closed shape with four equal interior angles of 90° each, wherein the detector pixel aspect ratio of two sides arranged at an angle of 90° to one another is 1:1. The detector pixel aspect ratio of a rectangular and additionally non-square detector pixel is, for example, 1:1.05 or more, for example 1:1.1 or more, 1:2 or more or even 1:10 or more. The detector pixel aspect ratio of a detector pixel may be unequal to an aspect ratio of the optical distortion which can be effected by microlenses in embodiments. In embodiments of the invention, one, several or all detector pixels can have a round, for example circular shape in atop view along a detection direction.

Some embodiments of the invention intend that two adjacent pixel rows of the first two-dimensional arrangement are arranged parallel to one another and have a row height and two adjacent pixel columns of the first two-dimensional arrangement are arranged parallel to one another and have a column width, wherein the row height differs in the amount from the column width. In this way, it is enabled that, on the one hand, particularly simple regular two-dimensional arrangements for the channels can be produced but, on the other hand, also good sampling of the object space is enabled whose density is sufficiently distance-independent. Particular advantages can be obtained when additionally two adjacent pixel rows of the second two-dimensional arrangement are arranged parallel to one another and have a row height and two adjacent pixel columns of the second two-dimensional arrangement are arranged parallel to one another and have a column width, wherein the column width differs in the amount from the now height. When two channels or also all channels of the multichannel optics image capturing apparatus comprise such two-dimensional arrangements of detector pixels that are arranged in that way in pixel rows and pixel columns, the channels can both be produced with simple methods and detuning of the channels with respect to one another can be obtained particularly easily, such that relatively homogeneous sampling of the object space is enabled independent of the distance of the object to the multichannel optics image capturing apparatus.

Accordingly, in some multi-channel optics image capturing devices according to the present invention, it is intended that the pixel rows of the first two-dimensional arrangement are arranged parallel to one another and the pixel columns of the first two-dimensional arrangement are arranged parallel to one another and the pixel rows of the second two-dimensional arrangement are arranged parallel to one another and the pixel columns of the second two-dimensional arrangement are arranged parallel to one another, wherein a row height of the first two-dimensional arrangement differs in the amount with respect to a row height of the second two-dimensional arrangement and/or a column width of the first two-dimensional arrangement differs in the amount with respect to a column width of the second two-dimensional arrangement. This allows particularly advantageous detuning between the two channels, such that a distance-independent relatively homogenous sampling of the object space is enabled. In this way, it is prevented that a great number of sampling points accumulates at specific distances, such that the resolution of the overall image would be reduced at this distance.

In embodiments, it is intended that the pixel rows and the pixel columns of the first two-dimensional arrangement are arranged perpendicular to one another and/or the pixel rows and pixel columns of the second two-dimensional arrangement are arranged perpendicular to one another. In this way, the object space can be sampled with a regular raster, such that the same regular raster can be used for the image space, and conversion between an irregular raster, for example of a channel, and a regular raster of the overall image can be omitted. In this way, generation of an overall image from captures of the individual channels is simplified. In some embodiments, it is intended that the rows enclose an angle of less than 90° with the columns of the first two-dimensional arrangement. Here, some embodiments provide that the angle is less than 70°, less than 50°, less than 30° or even less than 10°. In this way, for example, rhombical two-dimensional arrangements can be generated where, for example, rhombical pixels can be used. In some embodiments, it is intended that the rows and the columns of the second two-dimensional arrangement enclose an angle of less than 90°. Embodiments provide that the angle is less than 80°, less than 60°, less than 40°, less than 20° or less than 10°. If the angle between rows and columns of the first channel and/or the angle between rows and columns of the second channel is 90°, i.e., the rows and columns of the channel are each perpendicular to one another, in embodiments, rectangular and additionally non-square detector pixels and/or rectangular and additionally square detector pixels can be used that may be particularly easy to produce.

In embodiments of the invention, the first channel and the second channel are directly juxtaposed. This means that no further channel is arranged between the first channel and the second channel. In this way, partial or complete overlap of the fields of view of the sensors can be obtained without the viewing directions of the respective detector pixels of the channel having to be tilted to one another to a great extent. This can simplify the production of a multichannel optics image capturing apparatus and also make the same more cost-effective.

Embodiments of the invention are configured such that all channels of the multichannel optics image capturing apparatus are arranged regularly beside one another. An amount of channels that is arranged regularly beside one another can enable regular sampling of the object space in a particularly easy manner. Also, multichannel optics image capturing apparatuses set up in that way can be produced in a simplified manner. In some embodiments, however, the channels of the multichannel optics image capturing apparatus as well as, for example the detector pixels of some or all channels, are arranged arbitrarily in a plane. This enables a sufficiently distance-independent sampling of the object space in a particularly reliable manner, since in that way it can become extremely unlikely that a large number of sampling points overlap at a specific distance, such that the resolution of the capturing would be reduced.

Embodiments of the invention intend that all channels are arranged beside and below one another in rows and columns of a regular channel matrix. This is not opposed by the fact that basically also individual channels deviate from this regular channel matrix as it is intended in some embodiments. However, if all channels are arranged beside and below one another in rows and columns in a regular channel matrix, a multichannel optics image capturing apparatus set up in that way can be particularly easy to produce and enable regular sampling of the object space.

In some embodiments, the multichannel optics image capturing apparatus according to the present invention includes a third channel which includes a third two-dimensional arrangement of detector pixels which is incongruent both with respect to the first two-dimensional arrangement and with respect to the second two-dimensional arrangement. By using 3 channels, the resolution of the object to be mapped can be enhanced. Further resolution enhancements can be obtained by further channels. Further resolution enhancements can be obtained by using 4, 5, 6 or more, 10 or more, 15 or more, 30 or more or even 50 or more channels. Then, it can be advantageous that each of the channels comprises, with respect to each other channel, a two-dimensional arrangement of detector pixels which is incongruent with respect to the other channels. In this way, the resolution can remain almost constant or completely constant at any arbitrary distance between object to be captured and multichannel optics image capturing apparatus.

Some embodiments of the invention intend that the first channel, the second channel and the third channel are arranged in a common channel matrix where all channels of the multichannel optics image capturing apparatus form channel rows parallel to one another and channel columns parallel to one another, wherein the channel rows and the channel columns are arranged perpendicular to one another and the first two-dimensional arrangement, the second two-dimensional arrangement and the third two-dimensional arrangement are formed of detector pixels each arranged in a pixel matrix of parallel pixel columns and parallel pixel rows arranged perpendicular to the pixel columns. In this way, very regular sampling of the object space is enabled in a particularly simple manner and simultaneously an almost or completely distance-independent resolution is enabled.

BRIEF DESCRIPTION OF THE DRAWINGS

Embodiments of the present invention will be detailed subsequently referring to the appended drawings, in which.

DETAILED DESCRIPTION OF THE INVENTION

In the following, the invention will be discussed with reference to the above stated FIGS. 1 to 4. However, the invention is not limited to the illustrated embodiments. Same reference numbers in different embodiments describe comparable elements.

Figure 1A:
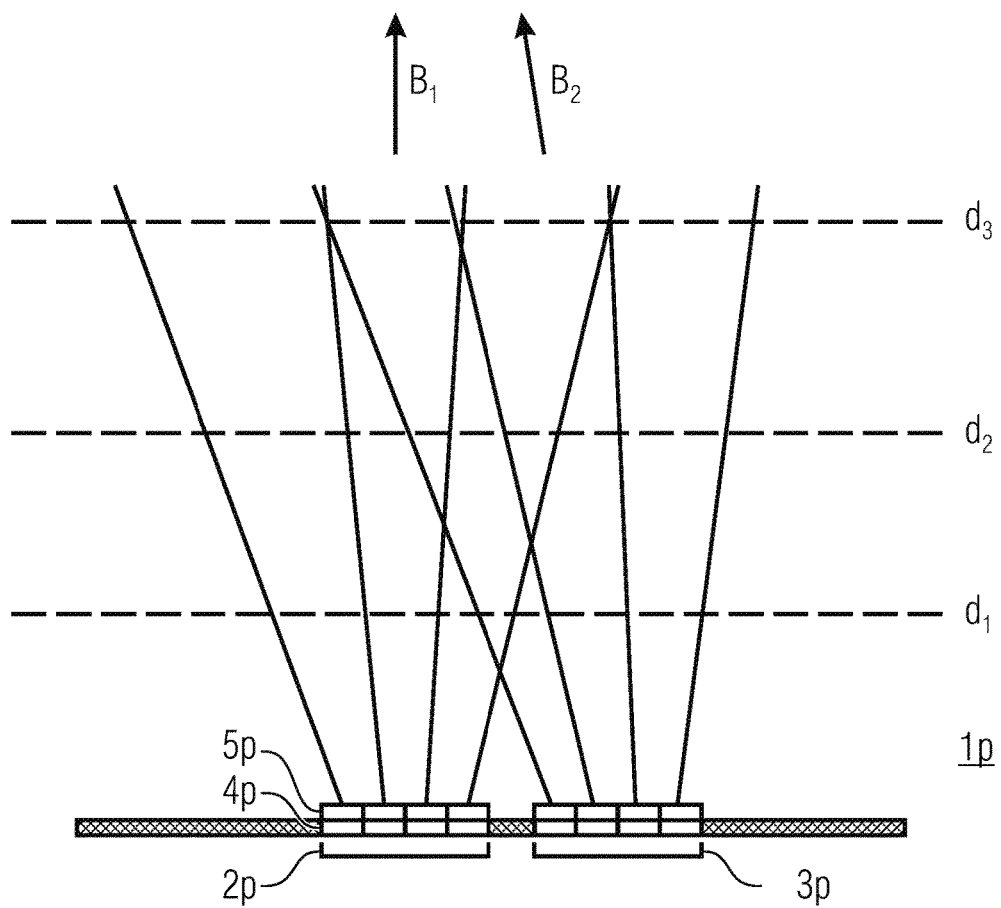
FIGS. 1a) and 1b) a one-dimensional illustration of an optical path with parallax effect in a multichannel optics image capturing apparatus (conventional technology)

FIG. 1 shows an optical path with parallax effect in a multichannel optics image capturing apparatus $1p$. The multichannel optics image capturing apparatus $1p$ is configured to generate an overall image from individual images of several channels $2p$, $3p$. FIG. 1a shows a first channel $2p$ and a second channel $3p$, wherein the first channel $2p$ comprises a first two-dimensional arrangement of detector pixels $4p$ and the second channel $3p$ comprises a second two-dimensional arrangement of detector pixels $4p$. The first channel $2p$ includes four detector pixels $4p$ and the second channel $3p$ includes four detector pixels $4p$. The detector pixels $4p$ each have a square shape and are each arranged in a similar manner regularly beside one another in each channel $2p$, $3p$. The first channel $2p$ and the second channel $3p$ additionally comprise a mapping optics $5p$ which is configured to effect mapping onto the arrangement of detector pixels $4p$. For each detector pixel $4p$, the mapping optics $5p$ includes a micro lens which is respectively configured to map an object to be mapped at an aspect ratio of 1:1, i.e., in an undistorted manner onto the detector pixel $4p$ arranged below the same. The first channel $2p$ and the second channel $3p$ have different viewing directions $B_1$ and $B_2$, such that the field of view of the first channel $2p$ completely overlaps the field of view of the second channel $3p$ in the object space.

Figure 1B:
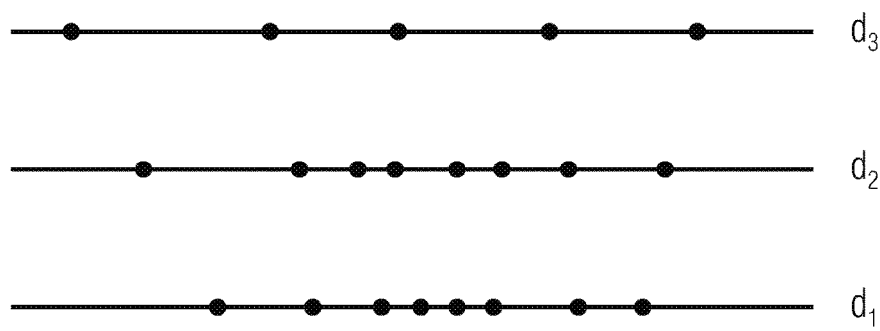

By the respective identical regular arrangement of the detector pixels $4p$ and the mapping optics $5p$ mapping an object to be mapped at the aspect ratio 1:1 onto the detector pixels $4p$, the resolution of the overall image according to FIG. 1b) is distance-dependent. The first channel $2p$ and the second channel $3p$ can sample an object to be captured at a maximum of eight sampling regions with their respective four detector pixels $4p$. Thus, at distances d1 and d2, with respect to a single-channel optics image capturing apparatus, super sampling of the object to be captured can take place with up to eight instead of at the most four sampling regions. At a distance d3, the sampling regions of detector pixels 4p of the first channel 2b overlap with sampling regions of detector pixels 4p of the second channel 3p. However, only five sampling regions exist, such that the image resolution of the overall image decreases with respect to distances d1 and d2. This is called parallax effect. The same represents a problem since it is desirable to obtain optimum usage of all possible sampling regions of the detector pixels 4p independent of the distance d of an object to be captured. Thus, overlapping of sampling regions is to be reduced or completely prevented in order to be able to obtain an overall image with a resolution that is as high as possible.

As a first solution, the invention suggests a multichannel optics image capturing apparatus 1, wherein at least a first channel 2 comprises an anamorphic mapping optics 5 and the first channel 2 has an at least partial field of view overlap with a second channel 3. As a second solution, the invention suggests a multichannel optics image capturing apparatus 1 comprising at least a first channel 2 and a second channel 3, wherein the first channel 2 comprises an at least partial field of view overlap with the second channel 3, and the first channel 2 includes a first two-dimensional arrangement of detector pixels 4 and the second channel 3 comprises a second two-dimensional arrangement of detector pixels 4 and the first two-dimensional arrangement is incongruent with respect to the second two-dimensional arrangement. Thereby, it is respectively obtained that a distance-dependent overlapping of sampling regions of the detector pixels 4 is reduced or completely prevented, such that the overall image formed from individual images of the channels 2, 3 comprises an essentially constant detail resolution independent of the distance to the object to be mapped.

Figure 2:
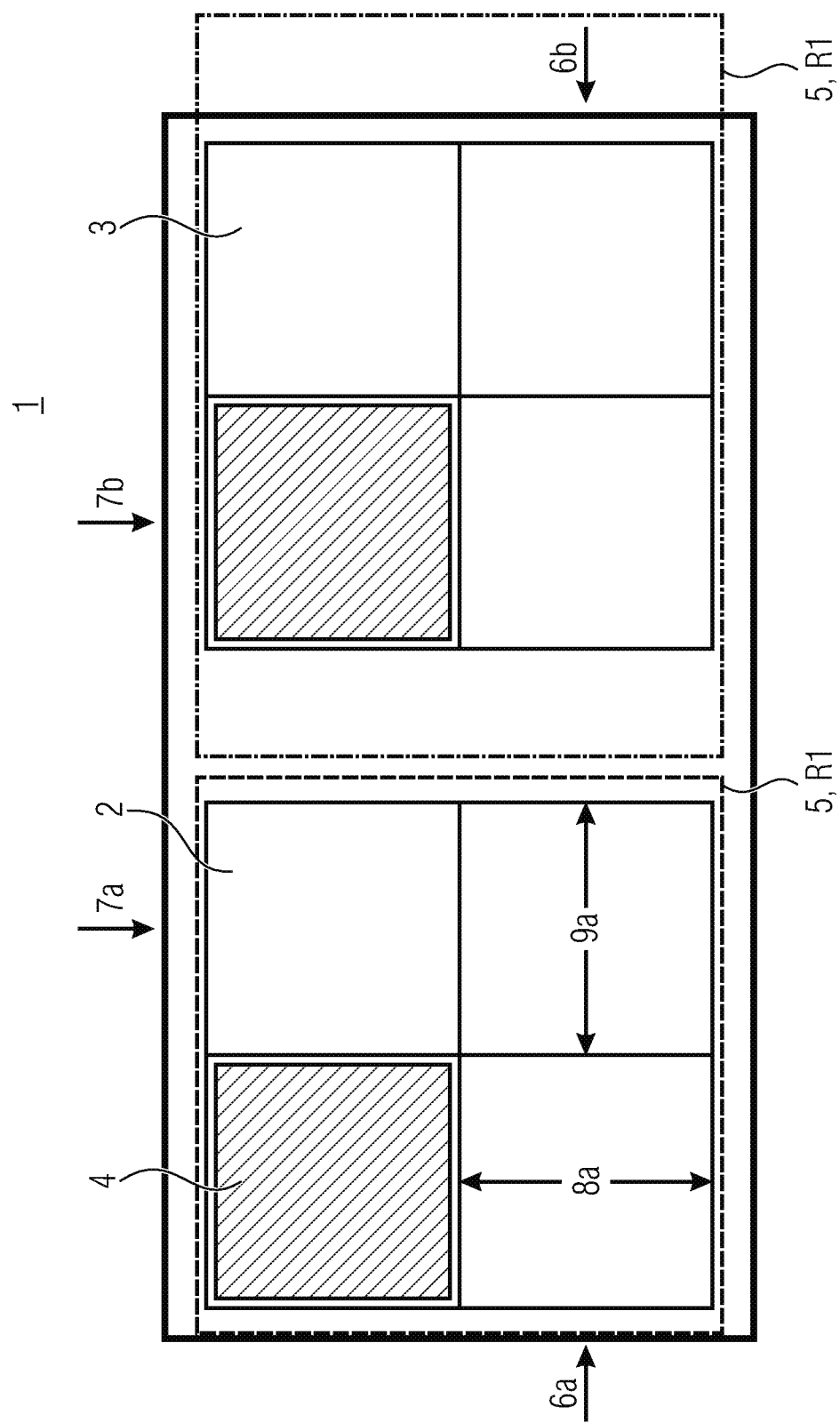
FIG. 2 a top view of an embodiment of the present invention according to claim 1 in a multichannel optics image capturing apparatus.

An embodiment of the invention according to the first suggested solution is illustrated in FIG. 2. A multichannel optics image capturing apparatus 1 of the type shown in a top view of the image plane comprises a first channel 2 and a second channel 3. The first channel 2 and the second channel 3 have a complete field of view overlap since the multichannel optics image capturing apparatus 1 is a plenoptic camera additionally comprising a further lens upstream to the anamorphic mapping optics 5. Since the first channel 2 and the second channel 3 are arranged directly juxtaposed, the first channel 2 and the second channel 3 only have slightly differing viewing directions which have no effect on the illustration in FIG. 2. The first channel 2 and the second channel 3 form a regular channel matrix with two channel columns and one channel row.

According to FIG. 2, the first channel 2 comprises a planar first two-dimensional arrangement of detector pixels 4 and the second channel 3 comprises a planar second two-dimensional arrangement of detector pixels 4. Both in the first channel 2 and in the second channel 3, exemplarily, merely one detector pixel 4 is illustrated. However, pixel rows 6a, 6b and pixel columns 7a, 7b include further detector pixels 4 which are not illustrated and which are regularly spaced apart, such that the pixel rows 6a, 6b and the pixel columns 7a, 7b are occupied regularly in a matrix shape with a detector pixel 4 per field of the matrix of pixel rows 6a, 6b and pixel columns 7a, 7b. The same applies analogously for the illustrations in FIGS. 3 and 4. In FIG. 2, the detector pixels 4 have a square shape in the top view and the first two-dimensional arrangement of detector pixels 4 is congruent with respect to the second two-dimensional arrangement of detector pixels 4. However, it is immediately obvious that the first two-dimensional arrangement of detector pixels 4 can instead be incongruent with respect to the second two-dimensional arrangement of detector pixels 4 in comparative embodiments according to the first suggested solution.

The first channel 2 comprises an anamorphic mapping optics 5 which is configured to effect mapping onto the arrangement of detector pixels 4 arranged below the same. The second channel 3 comprises an anamorphic mapping optics 5 which is configured to effect mapping onto the arrangement of detector pixels 4 arranged below the same. The rectangles R1 and R2 illustrated in a dotted manner illustrate how the anamorphic mapping optics 5 maps an object to be mapped, in this case a square subject having an aspect ratio of 1:1 in reality, onto the first channel 2 and onto the second channel 3, respectively. The anamorphic mapping optics 5 comprises a microlens which is configured to map an object to be mapped at an aspect ratio of 1:1.05 or more onto the arrangement of detector pixels 4 of the first channel 2 in a distorted manner. The distortion or change of distortion with respect to a further distortion effective for the respective channel can advantageously be effective for the entire channel in a similar, homogeneous or at least continuously variable manner. Thus, the square subject to be mapped, as illustrated by R1, is mapped as rectangular subject having the aspect ratio of 1:1.05 or more, more accurately 1:1.1. Additionally, the anamorphic mapping optics 5 comprises a microlens that is configured to map the object to be mapped at an aspect ratio of 1:1.4 onto the arrangement of detector pixels 4 of the second channel 3 in a distorted manner. Thus, the square subject to be mapped, as illustrated by R2, is mapped as rectangular subject having an aspect ratio of 1:1.4. This is achieved by the microlenses in that the same are provided with a cylindrical surface. Accordingly, the anamorphic mapping optics 5 of each channel is configured to map an object to be mapped onto each channel 2, 3 with a distortion which is uniquely allocatable to the respective channel 2, 3 with respect to the other channel 2, 3 at an aspect ratio of 1:1.05. Thus, in the illustrated embodiment according to FIG. 2, all channels 2, 3 include a two-dimensional arrangement of detector pixels 4 each forming a pixel matrix of pixel rows 6a, 6b and pixel columns 7a, 7b per channel 2, 3, wherein the pixel rows 6a and pixel columns 7a of each channel 2, 3 are each arranged perpendicular to one another, and all channels 2, 3 are arranged in a channel matrix of channel rows and channel columns perpendicular to one another, and the anamorphic mapping optics 5 is configured to map an object to be mapped onto each channel 2, 3 with a distortion which is uniquely allocatable to the respective channel 2, 3 with respect to all other channels 2, 3 at an aspect ratio of 1:1.05 or more.

By the first solution illustrated based on FIG. 2, other optical details of the object to be captured are captured via the first channel 2 than via the second channel 3. By suitable conversion of the respective channel information, an overall image is obtained comprising a high resolution independent of the distance, since the first channel 2 and the second channel 3 can each capture different optical information on the object to be mapped via the anamorphic mapping optics 5. The anamorphic mapping optics 5 can, for example, be arranged only in one channel or, in other words, the mapping optics of a channel can be non-anamorphic. With respect to the first channel, for example, the respective anamorphic mapping optics effects no change of the distortion and with regard to the second channel 3, the respective mapping optics effects a change of the distortion. In this case, the effected distortion and/or the allocated aspect ratio can be allocated to the second channel 3. Alternatively, or additionally, the non-effected distortion can be allocated to the first channel 2, for example by means of an aspect ratio of 1:1. As stated above, the mapping optics each affecting effective mapping for the entire channel can be anamorphic with respect to both, several or all channels. According to an embodiment, in the end, the arrangement of images lying in the image plane of the respective mapping objects of the pixels residing in the object plane of the respective mapping objects comprises a channel-individual aspect ratio of, for example, a horizontal pixel center distance to a vertical pixel center distance. i.e., the aspect ratio varies among the channels, i.e., differs between channels, whereby, as described, the interval of object distances is increased within which overlapping of pixel images on the image plane side of different channels is prevented. Varying of the image point aspect ratios on the object plane side between channels is also possible and is the subject matter of the following description.

Figure 3:
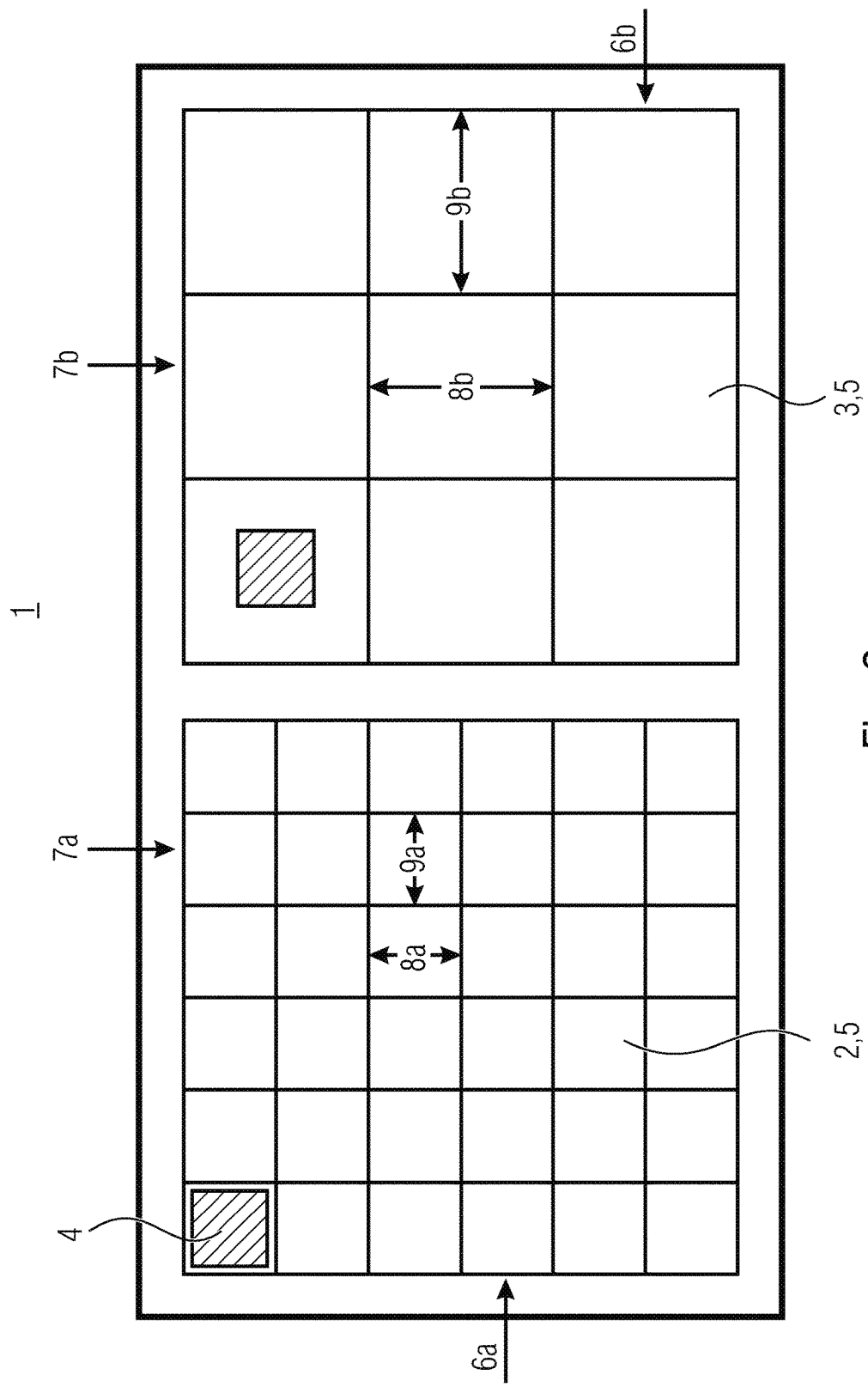
FIG. 3 a top view of a first embodiment of the present invention according to claim 11 in a multichannel optics image capturing apparatus which is a plenoptic camera.

A first embodiment of the invention according to the second suggested solution is illustrated in FIG. 3. A multichannel optics image capturing apparatus 1 of the type shown there in a top view on the image plane comprises two channels 2, 3, a first channel 2 and a second channel 3. The first channel 2 and the second channel 3 comprise a partial field of view overlap. The first channel 2 and the second channel 3 comprise the same viewing directions. In this embodiment, each channel 2, 3 of the multichannel optics image capturing apparatus 1 also comprises a two-dimensional arrangement of detector pixels 4 and mapping optics 5 which is configured to effect mapping onto the arrangement of detector pixels 4. However, in this embodiment of the second suggested solution for each channel 2, 3, this is a mapping optics 5 which is configured to map an object to be mapped at an aspect ratio of 1:1, i.e., undistorted with respect to reality. Instead of an anamorphic mapping optics 5, in the first channel 2, a first two-dimensional arrangement of detector pixels 4 and in the second channel 3 a second two-dimensional arrangement of detector pixels 4 are provided, wherein the first two-dimensional arrangement is incongruent with respect to the second two-dimensional arrangement. Thus, a mostly distance-independent resolution of an overall image is ensured by means of a suitable inventive implementation of the two-dimensional arrangements of detector pixels 4 in the first channel 2 and in the second channel 3, instead of using an anamorphic mapping optics 5. In this embodiment, the detector pixels 4 are again detector pixels 4 that are square and additionally rectangular in a top view which are easy to produce and cost effective. However, detector pixels 4 that are rectangular and non-square in the top view or also detector pixels 4 that are round in a top view can be provided, since the inventive solution is not limited to a specific design of the detector pixels 4.

In the following, the first channel 2 and the second channel 3 according to the second suggested solution will be described in more detail with reference to FIG. 3. The first two-dimensional arrangement is similar to the second two-dimensional arrangement, since the detector pixels 4 of the first two-dimensional arrangement are arranged in a matrix of pixel rows 6a and pixel columns 7a. In this embodiment, the first two-dimensional arrangement is a square matrix of six pixel rows 6a and six pixel columns 7a. Additionally, the detector pixels 4 of the second two-dimensional arrangement are arranged in a matrix of pixel rows 6b and pixel columns 7b. In this embodiment, the second two-dimensional arrangement is a square matrix of three pixel rows 6b and three pixel columns 7b. In other words, both in the first channel 2 and in the second channel 3, two adjacent pixel rows 6a, 6b are each arranged parallel to one another and have a row height 8a, 8b and two adjacent pixel columns 7a, 7b are arranged parallel to one another and have a first column width 9a, 9b, wherein a row height 8a, 8b corresponds to the column width 9a, 9b as regards to the amount. Here, the row height 8a of the first two-dimensional arrangement differs with respect to the row height 8b of the second two-dimensional arrangement and the column width 9a of the first two-dimensional arrangement differs with respect to the column width 9b of the second two-dimensional arrangement. Each detector pixel 4 is equally spaced apart from its neighbor according to the amount both in the first channel 2 and in the second channel 3, such that a square raster of detector pixels 4 is formed for the first channel 2 which differs from a square raster of the second channel 3. However, mathematically, two different squares are similar to one another. Thus, in this embodiment, the first two-dimensional arrangement and the second two-dimensional arrangement are similar to one another.

Figure 4:
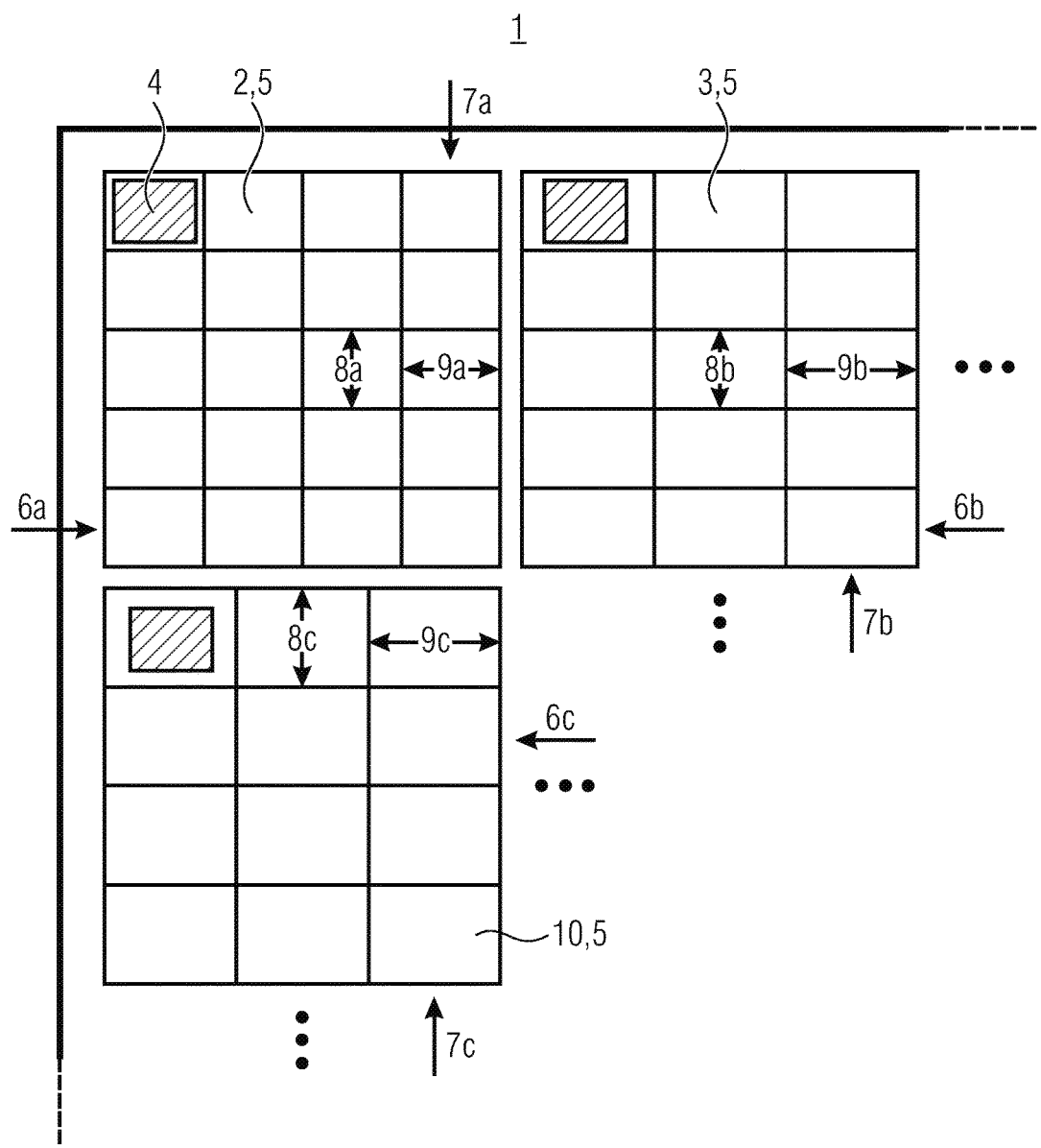
FIG. 4 a top view of a second embodiment of the present invention according to claim 11 in a multichannel optics image capturing apparatus.

A second embodiment of the invention according to the second suggested solution is illustrated in FIG. 4. A multichannel optics image capturing apparatus 1 of the type shown in a top view onto the image plane is a plenoptic camera additionally comprising a further lens upstream to a mapping optics 5. The multichannel optics image capturing apparatus 1 comprises $N^2$ channels 2, 3, 10 arranged in a regular N×N channel matrix, such that all channels 2, 3, 10 have the same distance to their direct neighboring channels and are arranged beside one another and below one another. Thus, all channels 2, 3, 10 form channel columns parallel to one another and channel rows parallel to one another. Exemplarily, a first channel 2, a second channel 3 and a third channel 10 are illustrated. The first channel 2 has a first two-dimensional arrangement of detector pixels 4. The second channel 3 has a second two-dimensional arrangement of detector pixels 4. The first channel 2 and the second channel 3 are directly juxtaposed. The third channel 10 has a third two-dimensional arrangement of detector pixels 4. The third two-dimensional arrangement is incongruent both with respect to the first two-dimensional arrangement and with respect to the second two-dimensional arrangement. Since the first two-dimensional arrangement is also incongruent with respect to the second two-dimensional arrangement, all three two-dimensional arrangements of the exemplarily shown channels 2, 3, 10 are incongruent to one another. The remaining $N^2-3$ channels are configured such that all $N^2$ channels comprise uniquely distinguishable two-dimensional arrangements of detector pixels 4 that are incongruent to one another. Some of the $N^2-3$ further channels comprise pseudorandom arrangements of detector pixels, while the remaining $N^2-3$ further channels comprise two-dimensional arrangements having regular pixel rows 6a, 6b, 6c and pixel columns 7a, 7b, 7c. Obviously, all of the $N^2-3$ further channels can comprise two-dimensional arrangements with regular pixel rows 6a, 6b, 6c and pixel columns 7a, 7b, 7c, i.e., only represent design variations of the first channel 2, the second channel 3 or the third channel 10 in order to enable a production that is as simple as possible.

In the embodiment according to FIG. 4, the first two-dimensional arrangement of detector pixels 4 is an arrangement of rectangular and additionally non-square detector pixels 4. It is a two-dimensional arrangement where the detector pixels 4 are arranged in pixel rows 6a which are arranged parallel to one another and pixel columns 7a which are arranged parallel to one another. Additionally, pixel rows 6a and pixel columns 7a are arranged perpendicular to one another. In the embodiment according to FIG. 4, the second two-dimensional arrangement of detector pixels 4 is also an arrangement of rectangular and additionally non-square detector pixels 4. This is a further two-dimensional arrangement where the detector pixels 4 are arranged in pixel rows 6b that are arranged parallel to one another and pixel columns 7b that are arranged parallel to one another. Additionally, pixel rows 6b and pixel columns 7b are arranged perpendicular to one another. In the embodiment according to FIG. 4, the third two-dimensional arrangement of detector pixels 4 is also an arrangement of rectangular and additionally non-square detector pixels 4. This is a further two-dimensional arrangement where the detector pixels 4 are arranged in pixel rows 6c that are arranged parallel to one another and pixel columns 7c that are arranged parallel to one another. Additionally, the pixel rows 6c and the pixel columns 7c are arranged perpendicular to one another. The detector pixels 4 of the first channel 2, the second channel 3 and the third channel 10 are the same and hence have the same detector pixel aspect ratios. Thus, the first channel 2, the second channel 3 and the third channel 10 cannot be distinguished based on their respective detector pixel aspect ratios because the detector pixel aspect ratio of the detector pixel 4 is the same from channel to channel. For the first channel 2, for the second channel 3 and for the third channel 10, the detector pixel aspect ratio is each 1:1.05 or more. However, it is immediately clear that in embodiments of the invention that are not shown, rectangular and additionally non-square detector pixels 4 having detector pixel aspect ratios which differ from channel to channel can exist for two or also all $N^2$ channels, such that, for example, the pixel rows 6a, 6b, 6c and the pixel columns 7a, 7b, 7c of two or all channels are optimally used with respect to a provided area, as it is not the case in the embodiment according to FIG. 4. For example, each channel can be uniquely identified based on its individual pixel aspect ratio which is hence not the same for any two channels. Differing detector pixel aspect ratios can be understood such that the detector pixel aspect ratio of a channel, for example channel 2, has the value of 1:x and the pixel aspect ratio of another channel, for example channel 3, has a value of 1:y. x and y can have a value of 1.05 or more and differ from one another. Alternatively, the other channel can have a detector pixel aspect ratio y:1 or x:1. A detector pixel aspect ratio of x:1 or y:1 means an arrangement of the detector pixels rotated by an angle of ±90° or ±270° compared to pixels having the detector pixel aspect ratio 1:x or 1:y.

In contrary to the illustration, the channels 2, 3 and/or 10 can also have the same number of detector pixels and above that the same number of columns and rows. This can be advantageous to obtain comparability and/or combinability of the images of the individual channels. In particular, this can be performed such that the detector pixels of the first channel 10 are arranged in a manner rotated at an angle of 90° with respect to the detector pixels 4 of the second channel.

The first two-dimensional arrangement has a row height 6a and a column width 7a, which differs in the amount from the row height 6a of the first two-dimensional arrangement. Additionally, the column width 7a of the first two-dimensional arrangement differs in the amount from a column width 7b of the second two-dimensional arrangement. The row height 6a of the first two-dimensional arrangement corresponds to a row height 6b of the second two-dimensional arrangement. This means that the first two-dimensional arrangement can be converted to the second two-dimensional arrangement by translation and additional one-dimensional extension. It is immediately obvious that the second two-dimensional arrangement could also be arranged in a rotated manner in the viewing plane, for example rotated by 90°, such that the first two-dimensional arrangement could be converted to the second two-dimensional arrangement by translation, additional one-dimensional extension and additional rotation.

The third two-dimensional arrangement has a row height 6c and a column width 7c, which differs in the amount from the row height 6c of the third two-dimensional arrangement. Additionally, the amount of the row height 6c of the third two-dimensional arrangement differs both from the amount of the row height 6a of the first two-dimensional arrangement and from the amount of the row height 6b of the second two-dimensional arrangement. Additionally, the amount of the column width 7c of the third two-dimensional arrangement differs both from the amount of the column width 7a of the first two-dimensional arrangement and from the amount of the column width 7b of the second two-dimensional arrangement. Thus, in this embodiment, the pixel rows 6a of the first two-dimensional arrangement are arranged parallel to one another and the pixel columns 7a of the first two-dimensional arrangement are arranged parallel to one another and the pixel rows 6b of the second two-dimensional arrangement are arranged parallel to one another and the pixel columns 7b of the second two-dimensional arrangement are arranged parallel to one another, wherein the row height 8a of the first two-dimensional arrangement is the same as regards to the amount with respect to the row height 8c of the third two-dimensional arrangement, and the column width 9a of the first two-dimensional arrangement is different as regards to the amount with respect to the column width 9b of the second two-dimensional arrangement. Additionally, in this embodiment, the pixel rows 6a of the first two-dimensional arrangement are arranged parallel to one another and the pixel columns 7a of the first two-dimensional arrangement are arranged parallel to one another and the pixel rows 6c of the third two-dimensional arrangement are arranged parallel to one another and the pixel columns 7c of the third two-dimensional arrangement are arranged parallel to one another, wherein the row height 8a of the first two-dimensional arrangement differs as regards to the amount with respect to the row height 8c of the third two-dimensional arrangement and the column width 9a of the first two-dimensional arrangement differs as regards to the amount with respect to the column width 9c of the third two-dimensional arrangement. However, it is obvious that in non-illustrated embodiments instead of or in addition to the third two-dimensional arrangement, the second two-dimensional arrangement is also implemented in that manner with regard to the first two-dimensional arrangement.

In all channels of the regular N×N channel matrix according to FIG. 4, which also comprise such a regular matrix of pixel rows 6a, 6b, 6c and pixel columns 7a, 7b, 7c, the row height 6 of any channel and its column width 7 are selected such that no two channels of the $N^2$ channels of the channel matrix have the same row height 6 and at the same time the same column width 7. In this way, a best possible coverage of the object space is obtained and a mostly distance-independent resolution is enabled for the multichannel optics image capturing apparatus.

The above stated features can be significant for the invention each by itself or in any combination with one another and this way the same can contribute to an inventive solution.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCE LIST

[1] Fleet, Kanaev, Scribner, Ackerman: Scene Independent Method for Image Formation in Lenslet Array Imagers. Patent Application US 20100013857A1
[2] Kartik Venkartaraman, Amandeed S. Jabbi, Robert H. Mullis: Capturing and processing of images using monolithic camera array with heterogeneous imagers, ep09763194
[3] A. Oberdörster, F. Wippermann, A. Bruckner: Bildaufnahmevorrichtung Lind Verfahren zum Aufnehmen eines Bildes, German Patent Application 102010031535.4-31
[4] Ren Ng, Marc Levoy, Mathieu Brédif: Light Field Photography with a Hand-Held Plenoptic Camera. Stanford University Computer Science Tech Report CSTR 2005-02. April, 2005
[5] T. Georgiev, A. Lumsdaine: Focused Plenoptic Camera and Rendering. Journal of Electronic Imaging, Volume 19, Issue 2, 2010.
[6] Koskinen Samu T; Alakarhu Juha H; Salmelin EERO: Lenslet camera it rotated sensors, US020100321511A1
[7] M. Ben-Ezra, Z. Lin, B. Wilburn, and W. Zhang: Penrose Pixels for Super-Resolution. IEEE Transactions on Pattern Analysis and Machine Intelligence (PAMI), Vol. 33, No. 7, pp. 1370-1383, July 2011.

The invention claimed is:

1. Multichannel optics image capturing apparatus, wherein at least a first channel comprises anamorphic mapping optics and the first channel comprises an at least partial field of view overlap at least with a second channel;
    wherein all channels comprise a two-dimensional arrangement of detector pixels, each forming a pixel matrix of pixel rows and pixel columns per channel, wherein the pixel rows and pixel columns of each channel are each arranged perpendicular to one another, and all channels are disposed in a channel matrix of channel rows and channel columns that are perpendicular to one another, and the anamorphic mapping optics is configured to map an object to be mapped onto each channel with a distortion uniquely allocatable to the respective channel with respect to all other channels at an aspect ratio of 1:1.05 or more.

2. Multichannel optics image capturing apparatus according to claim 1, wherein each channel of the multichannel optics image capturing apparatus comprises:
    a two-dimensional arrangement of detector pixels; and
    mapping optics that is configured to effect mapping onto the arrangement of detector pixels.

3. Multichannel optics image capturing apparatus according to claim 1, wherein two or more channels have different viewing directions.

4. Multichannel optics image capturing apparatus according to claim 1, wherein the fields of view of two or more channels partially overlap.

5. Multichannel optics image capturing apparatus according to claim 1, wherein the fields of view of at least two channels completely overlap.

6. Multichannel optics image capturing apparatus according to claim 1, wherein the anamorphic mapping optics comprises one or several microlenses that are configured to map an object to be mapped at an aspect ratio of 1:1.05 or more on an arrangement of detector pixels of the first channel in a distorted manner.

7. Multichannel optics image capturing apparatus according to claim 1, wherein the anamorphic mapping optics comprises one or several microlenses having a cylindrical surface.

8. Multichannel optics image capturing apparatus according to claim 1, wherein the multichannel image capturing apparatus is a plenoptic camera additionally comprising a further lens upstream to the anamorphic mapping optics.

9. Multichannel optics image capturing apparatus according to claim 1, wherein the first channel comprises a first two-dimensional arrangement of detector pixels and the second channel comprises a second two-dimensional arrangement of detector pixels, and the first two-dimensional arrangement is incongruent with respect to the second two-dimensional arrangement.

10. Multichannel optics image capturing apparatus according to claim 9, wherein the multichannel image capturing apparatus comprises a third channel and the third channel comprises a third two-dimensional arrangement of detector pixels which is incongruent both with respect to the first two-dimensional arrangement and with respect to the second two-dimensional arrangement.

11. Multichannel optics image capturing apparatus comprising at least a first channel and a second channel, wherein the first channel comprises an at least partial field of view overlap with the second channel and the first channel comprises a first two-dimensional arrangement of detector pixels and the second channel comprises a second two-dimensional arrangement of detector pixels, and the first two-dimensional arrangement is incongruent with respect to the second two-dimensional arrangement;
    wherein the multichannel image capturing apparatus comprises a third channel and the third channel comprises a third two-dimensional arrangement of detector pixels which is incongruent both with respect to the first two-dimensional arrangement and with respect to the second two-dimensional arrangement.

12. Multichannel optics image capturing apparatus according to claim 11, wherein each channel of the multichannel optics image capturing apparatus comprises:
    a two-dimensional arrangement of detector pixels; and
    mapping optics that is configured to effect mapping onto the arrangement of detector pixels.

13. Multichannel optics image capturing apparatus according to claim 9, wherein the first two-dimensional arrangement is geometrically similar to the second two-dimensional arrangement.

14. Multichannel optics image capturing apparatus according to claim 9, wherein the first two-dimensional arrangement can be converted to the second two-dimensional arrangement by translation and additional one-dimensional extension.

15. Multichannel optics image capturing apparatus according to claim 9, wherein the first two-dimensional arrangement can be converted to the second two-dimensional arrangement by translation, additional one-dimensional extension and additional rotation.

16. Multichannel optics image capturing apparatus according to claim 9, wherein the detector pixels of the first two-dimensional arrangement are arranged in pixel rows and pixel columns and the detector pixels of the second two-dimensional arrangement are arranged in pixel rows and pixel columns.

17. Multichannel optics image capturing apparatus according to claim 16, wherein two adjacent pixel rows of the first two-dimensional arrangement are arranged parallel to one another and comprise a row height, and two adjacent pixel columns of the first two-dimensional arrangement are arranged parallel to one another and comprise a column width, wherein the row height differs in the amount from the column width.

18. Multichannel optics image capturing apparatus according to claim 16, wherein the pixel rows of the first two-dimensional arrangement are arranged parallel to one another and the pixel columns of the first two-dimensional arrangement are arranged parallel to one another and the pixel rows of the second two-dimensional arrangement are arranged parallel to one another and the pixel columns of the second two-dimensional arrangement are arranged parallel to one another, wherein a row height of the first two-dimensional arrangement differs in the amount with respect to a row height of the second two-dimensional arrangement and/or a column width of the first two-dimensional arrangement differs in the amount with respect to the column width of the second two-dimensional arrangement.

19. Multichannel optics image capturing apparatus according to claim 16, wherein the pixel rows and the pixel columns of the first two-dimensional arrangement are arranged perpendicular to one another and/or the pixel rows and the pixel columns of the second two-dimensional arrangement are arranged perpendicular to one another.

20. Multichannel optics image capturing apparatus according to claim 9, wherein the first channel and the second channel are directly juxtaposed.

21. Multichannel optics image capturing apparatus according to claim 9, wherein all channels of the multichannel optics image capturing apparatus are arranged regularly beside one another.

22. Multichannel optics image capturing apparatus according to claim 9, wherein all channels are arranged beside one another and below one another in channel rows and channel columns of a regular channel matrix.

23. Multichannel optics image capturing apparatus according to claim 12, wherein the multichannel image capturing apparatus is a plenoptic camera additionally comprising a further lens upstream to the mapping optics.

24. Multichannel optics image capturing apparatus according to claim 9, wherein the first channel, the second channel and the third channel are arranged in a common channel matrix, wherein all channels of the multichannel optics image capturing apparatus form channel rows that are parallel to each other and channel columns that are parallel to one another, wherein the first two-dimensional arrangement, the second two-dimensional arrangement and the third two-dimensional arrangement are formed of detector pixels that are each arranged in a pixel matrix of parallel pixel columns and parallel pixel columns arranged perpendicular to the pixel rows.

25. Multichannel optics image capturing apparatus, wherein at least a first channel comprises anamorphic mapping optics and the first channel comprises an at least partial field of view overlap at least with a second channel;
wherein a distortion of the anamorphic mapping optics of the first channel is configured such that mapping of an object comprises a first aspect ratio in the first channel and a second aspect ratio in the second channel, wherein the first aspect ratio is uniquely allocated to the first channel and the second aspect ratio is uniquely allocated to the second channel, such that on each channel a mapping of the object to be captured is captured which is distorted differently when compared to the other channels.

26. Multichannel optics image capturing apparatus according to claim 25, wherein the anamorphic mapping optics comprises one or several microlenses that are configured to map an object to be mapped at an aspect ratio of 1:1.05 or more on an arrangement of detector pixels of the first channel in a distorted manner.

27. Multichannel optics image capturing apparatus comprising at least a first channel, a second channel and a third channel, wherein the first channel comprises an at least partial field of view overlap with the second channel and the first channel comprises a first two-dimensional arrangement of detector pixels, the second channel comprises a second two-dimensional arrangement of detector pixels, the third channel comprises a third two-dimensional arrangement of detector pixels, wherein the first two-dimensional arrangement is incongruent with respect to the second two-dimensional arrangement and the third two-dimensional arrangement is incongruent with respect to the first two-dimensional arrangement and the second two-dimensional arrangement, and wherein the detector pixels of the first channel comprise a different detector pixel aspect ratio than detector pixels of the second channel;
wherein all channels of the multichannel optics image capturing apparatus are juxtaposed with the same distance to their directly neighboring channels.

28. Multichannel optics image capturing apparatus according to claim 27, wherein all channels are arranged beside one another and below one another in channel rows and channel columns of a channel matrix having the same distance to one another.

29. Multichannel optics image capturing method, wherein an object to be captured is captured by a multichannel image capturing apparatus, wherein at least a first channel comprises anamorphic mapping optics and the first channel comprises an at least partial field of view overlap at least with a second channel;
wherein all channels of the multichannel image capturing apparatus comprise a two-dimensional arrangement of detector pixels, each forming a pixel matrix of pixel rows and pixel columns per channel, wherein the pixel rows and pixel columns of each channel are each arranged perpendicular to one another, and all channels are disposed in a channel matrix of channel rows and channel columns that are perpendicular to one another, and the anamorphic mapping optics is configured to map an object to be mapped onto each channel with a distortion uniquely allocatable to the respective channel with respect to all other channels at an aspect ratio of 1:1.05 or more.

30. Multichannel optics image capturing method, wherein an object to be captured is captured with a multichannel image capturing apparatus comprising at least a first channel and a second channel and the first channel comprises an at least partial field of view overlap with the second channel, wherein the first channel comprises a first two-dimensional arrangement of detector pixels and the second channel comprises a second two-dimensional arrangement of detector pixels, and the first two-dimensional arrangement is incongruent with respect to the second two-dimensional arrangement;
wherein the multichannel image capturing apparatus comprises a third channel and the third channel comprises a third two-dimensional arrangement of detector pixels which is incongruent both with respect to the first two-dimensional arrangement and with respect to the second two-dimensional arrangement.

31. Multichannel optics image capturing method, wherein an object to be captured is captured with a multichannel image capturing apparatus, wherein the at least one first channel comprises anamorphic mapping optics and the first channel comprises an at least partial field of view overlap at least with a second channel, wherein a distortion of the anamorphic mapping optics of the first channel is configured such that a mapping of an object comprises a first aspect ratio in the first channel and a second aspect ratio in the second channel, wherein the first aspect ratio is uniquely allocated to the first channel and the second aspect ratio is uniquely allocated to the second channel, such that on each channel a mapping of the object to be captured is captured which is distorted differently when compared to the other channels.

32. Multichannel optics image capturing method, wherein an object to be captured is captured with a multichannel image capturing apparatus comprising at least a first channel, a second channel and a third channel and the first channel comprises an at least partial field of view overlap with the second channel, wherein the first channel comprises a first two-dimensional arrangement of detector pixels and the second channel comprises a second two-dimensional arrangement of detector pixels, wherein the first two-dimensional arrangement is incongruent with respect to the second two-dimensional arrangement and the third two-dimensional arrangement is incongruent with respect to the first two-dimensional arrangement and the second two-dimensional arrangement, and wherein the detector pixels of the first channel comprise a different detector pixel aspect ratio than detector pixels of the second channel;

wherein all channels of the multichannel optics image capturing apparatus are juxtaposed with the same distance to their directly neighboring channels.

* * * * *